(12) United States Patent
Espinosa Sanchez

(10) Patent No.: US 9,409,652 B2
(45) Date of Patent: Aug. 9, 2016

(54) DUAL PRESSURE REGULATION SYSTEM FOR AERIAL REFUELING OPERATIONS

(71) Applicant: EADS Construcciones Aeronáuticas S.A., Getafe (ES)

(72) Inventor: Martin Espinosa Sanchez, Getafe (ES)

(73) Assignee: EADS Construcciones Aeronauticas S.A., Madrid (ES)

( * ) Notice: Subject to any disclaimer, the term of this patent is extended or adjusted under 35 U.S.C. 154(b) by 124 days.

(21) Appl. No.: 14/292,003

(22) Filed: May 30, 2014

(65) Prior Publication Data

US 2015/0203210 A1 Jul. 23, 2015

(30) Foreign Application Priority Data

May 31, 2013 (EP) ..................................... 13382207

(51) Int. Cl.
*B64D 39/06* (2006.01)
*G05D 16/10* (2006.01)

(52) U.S. Cl.
CPC .............. *B64D 39/06* (2013.01); *G05D 16/103* (2013.01); *Y10T 137/7793* (2015.04)

(58) Field of Classification Search
CPC ....... B64D 39/06; F16K 31/12; F16K 11/065; F16K 11/10; F16K 15/186; F16K 17/02; F16K 31/1245; F16K 31/1225; F16K 31/124; G05D 16/103; G05D 16/106; G05D 16/10
USPC ......... 137/487, 488, 493, 614.19, 493.9, 613, 137/505.13
See application file for complete search history.

(56) References Cited

U.S. PATENT DOCUMENTS

| | | | | |
|---|---|---|---|---|
| 1,838,723 A * | 12/1931 | Welcker | ..................... | F16K 1/12 137/220 |
| 3,192,940 A * | 7/1965 | Wiersholm | ............. | B64D 39/06 137/220 |
| 3,399,690 A * | 9/1968 | Theodore | ................. | F16K 1/126 137/220 |
| 3,586,033 A * | 6/1971 | Hieber | .................... | B64D 39/06 137/220 |
| 3,742,972 A * | 7/1973 | Hughes | .................. | F16K 11/207 137/110 |
| 3,792,713 A * | 2/1974 | Zadoo | ...................... | F16K 1/126 137/220 |
| 3,851,852 A * | 12/1974 | Blanchard | .............. | B64D 39/06 137/614.04 |
| 4,437,485 A * | 3/1984 | Goodman | .............. | F16K 15/063 137/220 |

(Continued)

FOREIGN PATENT DOCUMENTS

WO WO 2008/145970 12/2008
WO WO 2010/084316 7/2010

OTHER PUBLICATIONS

European Search Report for EP 13 38 2207.2, dated Nov. 18, 2013, Wojski, Guadalupe.

*Primary Examiner* — Craig Schneider
*Assistant Examiner* — Daniel P Donegan
(74) *Attorney, Agent, or Firm* — Nixon & Vanderhye P.C.

(57) ABSTRACT

The present invention refers to a dual pressure regulation system to ensure a proper pressure regulation during the Aerial REFUELING operations with Hose and Drogue systems. More specifically is directed to dual redundant fuel pressure regulation systems. The pressure regulator system comprises two pressure regulators (10, 20) located in series and a control element (30) for controlling the movement of both regulators operatively connected downstream (34) the second pressure regulator (20) such that the movement of the pressure regulators (10, 20) is independently controlled by the control element (30) according to the delivery pressure downstream the second regulator (20).

14 Claims, 2 Drawing Sheets

(56) References Cited

U.S. PATENT DOCUMENTS

| | | | | | |
|---|---|---|---|---|---|
| 5,048,561 | A | * | 9/1991 | Taplin | F04B 1/324 137/493 |
| 5,215,121 | A | * | 6/1993 | Michl | E03C 1/106 137/488 |
| 5,660,198 | A | * | 8/1997 | McClaran | G05D 16/106 137/10 |
| 7,086,413 | B2 | * | 8/2006 | Yu | B62D 5/062 137/493 |
| 8,910,653 | B2 | * | 12/2014 | McAuliffe | F16K 31/12 137/220 |
| 2009/0302260 | A1 | * | 12/2009 | Savtchenko | F16K 3/0254 251/324 |
| 2010/0243061 | A1 | * | 9/2010 | Mouskis | G05D 16/106 137/1 |
| 2011/0232320 | A1 | * | 9/2011 | Satou | F16K 11/044 62/324.6 |
| 2012/0049004 | A1 | | 3/2012 | Cutler et al. | |
| 2014/0124059 | A1 | * | 5/2014 | McAuliffe | F16K 31/12 137/492 |
| 2015/0203210 | A1 | * | 7/2015 | Espinosa Sanchez | B64D 39/06 137/505 |

* cited by examiner

DUAL PRESSURE REGULATION SYSTEM FOR AERIAL REFUELING OPERATIONS

This application claims priority to EP Application No. 13382207.0 filed on May 31, 2013, the entire content of which is hereby incorporated by reference.

FIELD OF THE INVENTION

The present invention is directed to a dual pressure regulation system for aerial refueling operations. The invention is intended to ensure a proper pressure regulation during the aerial refueling operations with hose and drogue systems. More specifically is directed to dual redundant fuel pressure regulation systems. The invention is also intended to cover refueling couplings for use by tanker aircraft for aerial refueling fitted with the dual pressure regulation system.

BACKGROUND OF THE INVENTION

Aircraft include complex fuel systems that route aviation fuel from fuel tanks to aircraft systems that use the fuel. In the case of an aerial refueling, these systems can also include the fuel lines, manifolds and associated valving necessary for delivering fuel to a receiver aircraft.

Aerial REFUELING hoses are equipped with couplings at their end to allow a proper fit of the receiver aircraft.

Standard couplings are in accordance with the standard MIL-PRF-81975 and the historical standard MIL-C-81975. The current state of the art is based on MA-4 couplings. Those couplings have the mechanical interfaces defined by the military standard and, in general, comply with the performance requirements.

In terms of pressure regulation, current MA-4 couplings are equipped with two regulators which are located in series in a channel. The main regulator is exposed to the outlet or delivery pressure such that it is the regulator responsible for supplying said required outlet pressure. The other regulator or auxiliary regulator helps the main regulator in supplying high flows providing an additional pressure in the main regulator such that the main regulator is able to avoid its throttle.

The main regulator moves depending on the outlet pressure because it is directly exposed to it. When the pressure difference between the ambient pressure, measured through a port, and the delivery pressure exceeds a target value, the main regulator closes and when the difference is less, it is opened. Therefore the main regulator balances its position based on the balance of pressures on a restricting element.

The auxiliary pressure regulator is located before the main regulator so it is not exposed to the delivery pressure. The auxiliary pressure regulator, depending on the flow and on the inlet pressure, increases the downstream pressure to conform the operation range of the main regulator, preventing its throttle.

In fact, both regulators are needed to supply the required pressure. A drawback of current MA-4 couplings is that they are not able to independently achieve the delivery pressure requirement, this meaning that in the case of one pressure regulator failure, the system might not deliver the fuel at the required pressure causing potential damages on receiver pipelines.

Therefore, said coupling is not redundant as the working of both regulators is not independent and moreover in case of single failure the coupling is not able to properly regulate the delivery pressure.

Another drawback is that the failure of one of the regulators is a hidden failure only detected during routine maintenance tasks.

On the other hand, the high pressure drop of the current designs for MA-4 coupling is penalising the system performances due to narrow passages and sharp edges in the interior walls. Preliminary issues of the standard MIL-PRF-81975 specified lower values for the acceptable pressure drop which had to be increased to allow the fulfillment by the industry.

Currently there is a need in industry to have new couplings which ensure a full dual pressure regulation, however no system has been developed yet to ensure full redundancy on the pressure regulation system components.

SUMMARY OF THE INVENTION

The above mentioned drawbacks are solved by the claimed dual pressure regulation system.

A failure in the aerial refueling coupling pressure regulation system might be hazardous for the receiver aircraft pipelines. Therefore, dual pressure regulation in terms of redundancy is of utmost importance for the claimed invention.

The dual pressure regulator system as previously described in the background of the invention comprises a channel having an inlet and an outlet, a first pressure regulator and a second pressure regulator, being said first and said second pressure regulator located in series lengthwise said channel such that in use the fuel flow goes through both regulators.

As previously explained the inlet would be connectable to pipelines to a tanker aircraft and the outlet to pipelines to a receiver aircraft.

Moreover, the first pressure regulator comprises a first restricting element linearly movable into the channel throughout the positions between a first position and a second position configured to allow a first pressure drop through the inlet of the channel when in the first position and a second pressure drop in the second position.

The second pressure regulator comprises a second restricting element linearly movable into the channel throughout the positions between a first position and a second position configured to allow a first pressure drop through the outlet of the channel when in the first position and a second pressure drop in the second position.

The dual pressure regulator system object of the invention is characterized in that it further comprises a control element for controlling the movement of the first and the second pressure regulators. Said control element is operatively connected downstream the second pressure regulator for measuring the delivery pressure to the receiver aircraft. Therefore the first, the second pressure regulators and the control element are configured such that the movement of the first and the second pressure regulators is controlled by the control element according to the delivery pressure to the receiver aircraft downstream the second regulator.

The dual pressure regulation system object of the invention comprises two pressure regulators independently driven, located in series, but acting according to the delivery pressure measured downstream to both. The target pressure for both pressure regulators is the delivery pressure and said delivery pressure is the pressure which controls the position of each pressure regulator. In this way, it is possible to ensure the delivery pressure within the required range even with one regulator failed.

Under standard conditions, the first regulator will work in normal conditions and in case of failure of said first regulator, the second regulator would start working.

DESCRIPTION OF THE FIGURES

FIG. 3 is a schematic cross section of the embodiment shown in FIG. 2 showing the second regulator working and the first regulator in stand-by.

DETAILED DESCRIPTION OF THE INVENTION

An embodiment of the claimed invention consists of a new pressure regulation system to be fitted in couplings in accordance with standard MIL-PRF-81975.

Figure 1:
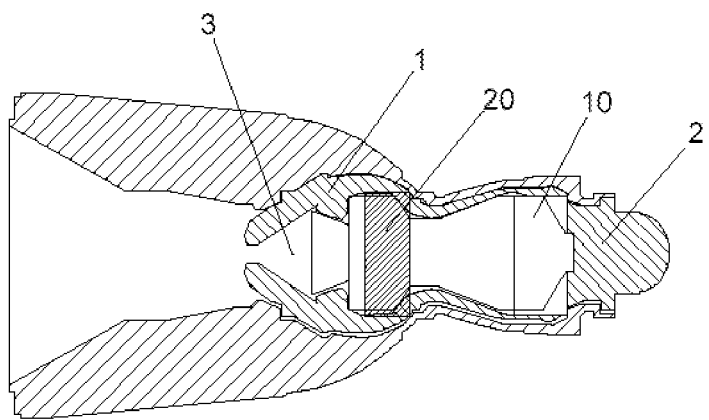
FIG. 1 is a schematic cross section of a known pressure regulation system.

FIG. 1 discloses a pressure regulator system of the state of the art. This device comprises two regulators (10, 20) located in series, a main regulator corresponding to the second pressure regulator (20) as it is the downstream regulator and an auxiliary regulator corresponding to the first pressure regulator (10) as it is the upstream regulator.

Figure 2:
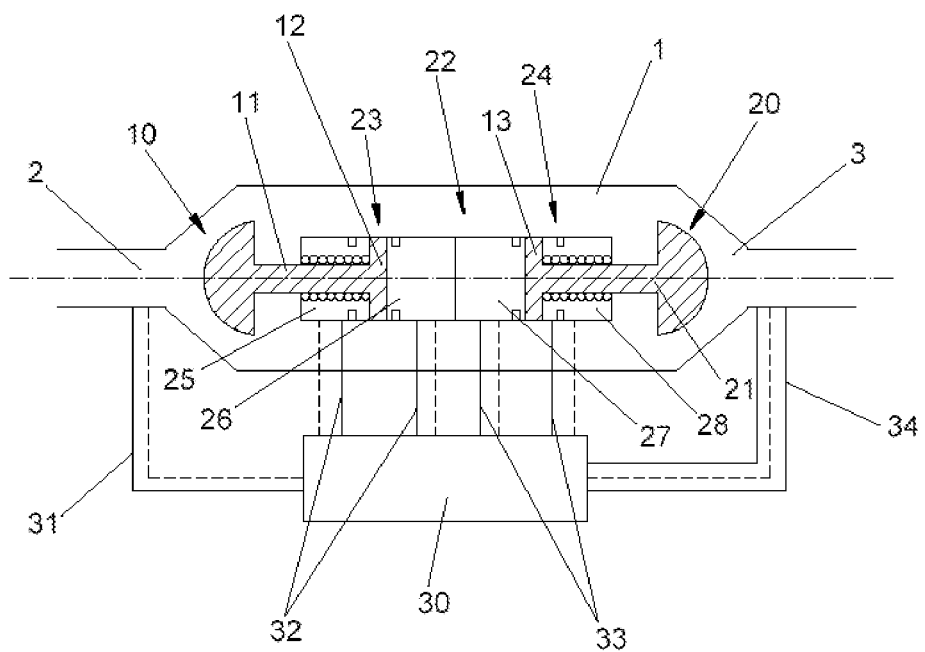
FIG. 2 is a schematic cross section of an embodiment of the invention.
Figure 3:
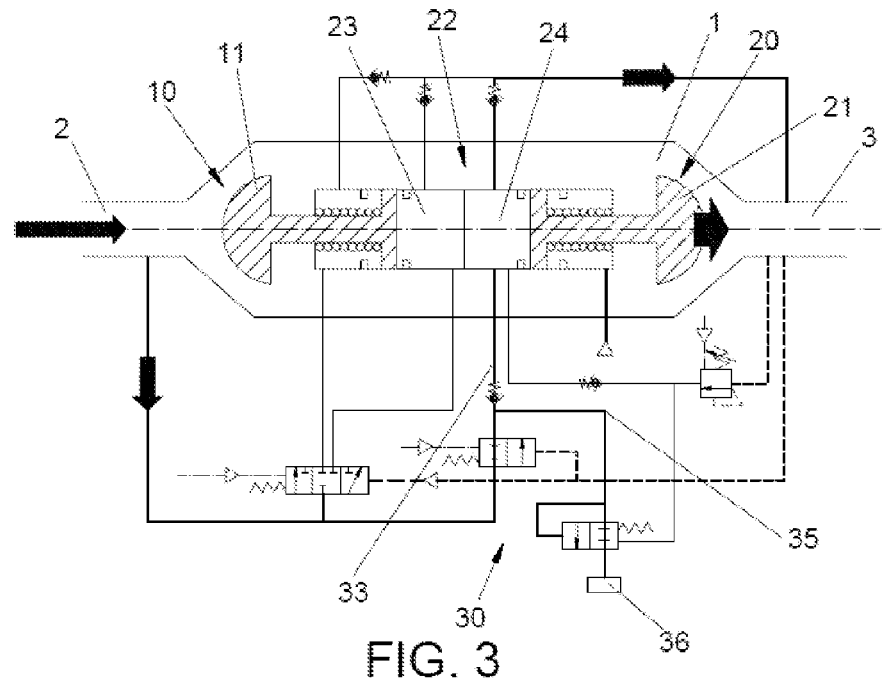
Figure 4:
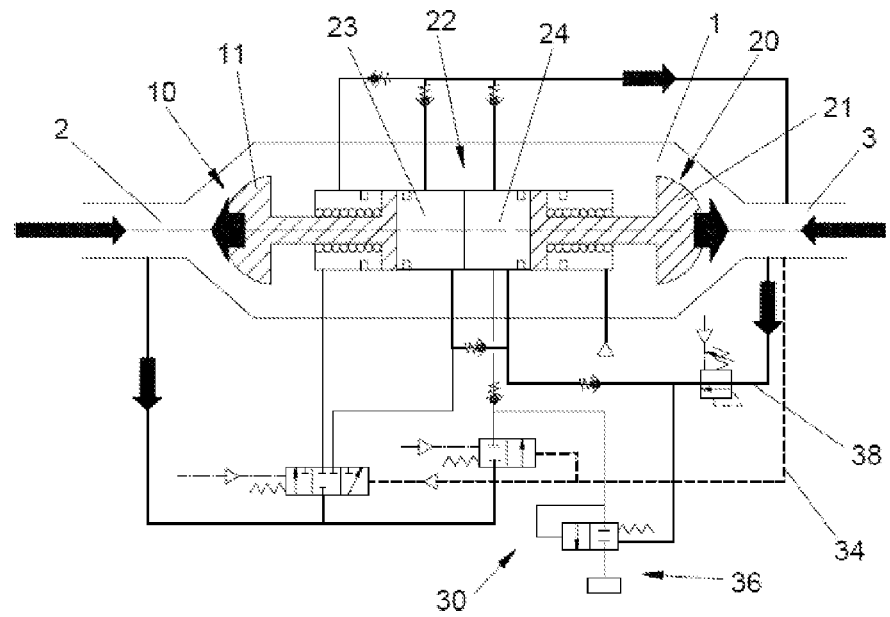
FIG. 4 is a schematic cross section of the embodiment shown in FIG. 2 showing the system working after a surge pressure.

FIGS. 2 to 4 discloses an embodiment of the claimed invention. Under standard conditions the first pressure regulator (10) is working and the second pressure regulator (20) is completely opened and in case the pressure drifts the second regulator (20) which is completely opened starts working.

As shown in FIG. 2 the first pressure regulator (10) would be stable within a tight pressure range around the nominal operating delivery pressure. If the delivery pressure becomes higher than the expected value, an inlet fuel pressure line (31) is piloted by the control (30) to close the first pressure regulator (10). If the delivery pressure becomes below the operational range, the first pressure regulator (10) is piloted to open.

Embodiment of FIG. 2 also discloses that the system further comprises a chamber (22) located into the channel (1) which is operatively connected to the first restricting and the second restricting element (11, 21) such that both elements (11, 21) are linearly movable with respect to said chamber (22).

Said chamber (22) comprises two separated cavities (23, 24) each one operatively connected to each restricting element (11, 21) and is divided into two subcavities (25, 26, 27, 28) by an extended part (12, 13) of the restricting elements (11, 21) capable of sliding in each cavity (23, 24).

The system also comprises different pressure lines (32, 33) for feeding each subcavity (23, 24). In that way every restricting element (11, 21) is independently controlled by the control element (30).

The first pressure regulator (10) is declared as failed if the delivery pressure reaches a fixed value over the nominal delivery pressure and the first pressure regulator (10) is not being commanded to close. At that case, the second pressure regulator (20) starts working in a similar way to the first pressure regulator (10).

As the second pressure regulator (20) is fed with independent pressure lines (33) redundancy is achieved.

Moreover the system also comprises the inlet fuel pressure line (31) to pressurize each cavity (23, 24) and a downstream pressure line (34) which operatively connect the control element (30) to the delivery pressure.

Additionally, the control element (30) is located outside the channel (1) at an external manifold.

The embodiment object of the invention also allows the detection of a first pressure regulator (10) failure.

The embodiment shown in FIG. 3 shows that the control element (30) comprises a failure indicator (36) which is equipped with an indication for the case of the second pressure regulator (20) working at operational conditions. This allows assessing during post flight maintenance tasks whether the first pressure regulator (10) has been declared failed.

More specifically, an auxiliary line (35) connected to the pressure line (33) of the second pressure regulator (20) is provided, said auxiliary line (35) feeds a visual indicator.

Another advantage of the present pressure regulation system is that during the receiver disconnection, the coupling is exposed to high pressure surges which have to be dumped. Those surges run through the coupling from the receiver aircraft to the tanker aircraft. To react against these surges, the pressure regulation system independently commands the two pressure regulators (10, 20) to close as soon as a pressure over the maximum working value is detected downstream the second regulator (20). This surge relief sub-system commands to close the pressure regulators (10, 20) with fuel pressure from the coupling downstream point (where the surge is started) and, in order to be quick enough, the fuel pressure flows to the cavities (23, 24) through feeding line (38) coming from downstream the second pressure regulator (20) as shown in FIG. 4.

The external control element (30) will be fixed to the channel (1), as a 'dressing', and it will be connected to the different cavities (23, 24) through pipes (32, 33) and holes along the struts which support the channel (1). Another advantage of the invention is that part of the hydro-mechanical elements, intended to move the pressure regulators (10, 20), have been taken out of the fuel path being outside the channel (1) and therefore, the area dedicated for the fuel way is wider, reducing the pressure drop. On the other hand, as far as part of the hydro-mechanical elements of the regulation mechanism has been placed outside to the channel (1), the regulator failure can be monitoring as previously stated. This represents an important advantage in terms of reduction of scheduled maintenance tasks.

As shown in the embodiment of FIGS. 2 to 4, both pressure regulators (10, 20) comprises two poppet valves. Other configurations would be possible, such as for instance mushrooms valves.

The channel (1) shown in the figures is cylindrical and also the inlet (2) and outlet (3). Also the chamber (22) is cylindrical which reduces the pressure drop through the chamber as compared with other couplings of the state of the art, and the reduced pressure drop improves system performances.

It is also an object of the present invention the coupling comprising a system according to one of the preceeding technical features.

The invention claimed is:

1. A dual pressure regulation system for aerial refueling operations comprising:
   a channel having an inlet and an outlet, wherein the inlet is connectable to a pipeline of a tanker aircraft and the outlet is connectable to a pipeline to a receiver aircraft,
   a first pressure regulator comprising a first restricting element linearly movable in the channel between a first position and a second position and configured to allow a first pressure drop through the inlet of the channel while in the first position and a second pressure drop while in the second position, and
   a second pressure regulator comprising a second restricting element linearly movable in the channel between a first position and a second position and configured to allow a first pressure drop through the outlet of the channel while in the first position and a second pressure drop while in the second position, wherein said first pressure regulator and said second pressure regulator are arranged in series lengthwise in said channel, a control element configured to control movement of the first and the second pressure regulators, wherein the control element is operatively connected to the pipeline to the receiver aircraft downstream the second pressure regulator and is configured to measure a delivery fuel pressure to the receiver aircraft and configured to move the first and the second pressure regulators according to the delivery fuel pressure to the receiver aircraft; a chamber within the channel and operatively connected to the first restricting element and the second restricting element such that the first and second restricting elements each move linearly with respect to the chamber, and the chamber comprises two separated cavities each of which is operatively connected a respective one of the first and second restricting elements, and an inlet fuel pressure line configured to provide pressurization to each cavity under control of the control element.

2. The dual pressure regulation system, according to claim 1 wherein each cavity is divided into two subcavities by an extended part of one of the first or second restricting elements configured to slide in the corresponding cavity.

3. The dual pressure regulation system, according to claim 2 further comprising a respective pressure line configured to pressurize each subcavity.

4. The dual pressure regulation system, according to claim 1 wherein the control element is located outside the channel.

5. The dual pressure regulation system, according to claim 1 further comprising an indicator configured to show a failure of the pressure regulators.

6. The dual pressure regulation system, according to claim 5 wherein the indicator is outside the channel.

7. The dual pressure regulation system, according to claim 4 further comprising an auxiliary line connecting a pressure line coupled to the second pressure regulator to a visual indicator, such that the auxiliary line provides pressure to the visual indicator.

8. The dual pressure regulation system, according to claim 4 further comprising a feeding line connecting the pipeline to the receiving aircraft downstream of the second pressure regulator to the cavities.

9. The dual pressure regulation system, according to claim 1 wherein the channel and the chamber are cylindrical.

10. The dual pressure regulation system, according to claim 1 wherein the first and second restricting elements each include a poppet valve.

11. The dual pressure regulation system, according to claim 5 wherein the indicator is located in the control element outside the channel.

12. The dual pressure regulation system, according to claim 6 further comprising an auxiliary line connecting the pressure line to the second pressure regulator and to a visual indicator such that the auxiliary line pressurizes the visual indicator.

13. The dual pressure regulation system, according to claim 7 further comprising a fuel feeding line extending from the pipeline to the tanker aircraft which is downstream of the second pressure regulator to the cavities and configured to pressurize said cavities.

14. A dual pressure regulation system configured for aerial refueling operations comprising:

a channel including an inlet and an outlet at opposite ends of the channel along an axis of the channel, wherein the inlet is connectable to a fuel line configured to connect to an upstream fuel line from a tanker aircraft and the outlet is connectable to a downstream fuel line configured to connect to a receiver aircraft, a first pressure regulator including a first restricting element within the channel and having a first end facing the inlet to the channel and a second end opposite to the first end, wherein the first restricting element is configured to move along the channel axis between a first position in which the first end is proximate to the inlet and a second position in which the first end is distal to the inlet, and a second pressure regulator including a first restricting element within the channel and having a first end facing the outlet to the channel and a second end opposite to the first end, wherein the second restricting element is configured to move along the channel axis between a first position in which the first end is proximate to the outlet and a second position in which the first end is distal to the outlet;

a chamber within the channel including a first cavity housing the second end of the first pressure regulator and a second cavity housing the second end of the second pressure regulator, wherein the second cavity is separated from the first cavity, and the first and second restriction elements move with respect to the chamber;

a control element configured to control movement of the first restricting element and the second restricting element, wherein the control element receives fuel pressure data indicating a fuel pressure in the downstream fuel line and the control element is configured to move each of the first and the second pressure regulators based on the fuel pressure data, and a pressure line in fluid communication with the upstream fuel line and controlled by the control line to provide pressurization to each of the first and second cavities, which pressurization is applied by the control element to move the first and second restricting elements.

* * * * *